United States Patent
Farwell et al.

(10) Patent No.: US 6,640,164 B1
(45) Date of Patent: Oct. 28, 2003

(54) METHODS AND SYSTEMS FOR REMOTE CONTROL OF SELF-PROPELLED VEHICLES

(75) Inventors: Mark L. Farwell, Colorado Springs, CO (US); Douglas E. Caldwell, Colorado Springs, CO (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/939,764

(22) Filed: Aug. 28, 2001

(51) Int. Cl.⁷ .................................. G05D 1/00
(52) U.S. Cl. .................. 701/2; 701/23; 701/24; 701/96; 340/903; 180/168
(58) Field of Search .................. 701/2, 23–25, 701/26, 93, 96, 300, 301; 342/70, 71; 340/425.5, 435, 436, 903, 901; 180/167, 168, 169

(56) References Cited

U.S. PATENT DOCUMENTS

| | | | |
|---|---|---|---|
| 5,532,690 A | | 7/1996 | Hertel |
| 5,646,843 A | | 7/1997 | Gudat et al. |
| 5,646,845 A | | 7/1997 | Gudat et al. |
| 5,711,388 A | | 1/1998 | Davies et al. |
| 5,781,119 A | * | 7/1998 | Yamashita et al. .......... 340/903 |
| 5,838,562 A | | 11/1998 | Gudat et al. |
| 5,872,526 A | | 2/1999 | Tognazzini |
| 5,899,289 A | * | 5/1999 | Uematsu ..................... 180/168 |
| 5,917,405 A | | 6/1999 | Joao |
| 5,921,708 A | | 7/1999 | Grundl et al. |
| 5,956,250 A | | 9/1999 | Gudat et al. |
| 6,028,537 A | | 2/2000 | Suman et al. |
| 6,032,097 A | * | 2/2000 | Iihoshi et al. .................. 701/96 |
| 6,169,940 B1 | * | 1/2001 | Jitsukata et al. .............. 701/23 |
| 6,285,929 B1 | * | 9/2001 | Hashimoto ................... 701/23 |
| 6,301,530 B1 | * | 10/2001 | Tamura ....................... 701/23 |
| 6,313,758 B1 | * | 11/2001 | Kobayashi .................. 340/932 |

* cited by examiner

*Primary Examiner*—Marthe Y. Marc-Coleman
(74) *Attorney, Agent, or Firm*—Edell, Shapiro & Finnan, LLC

(57) ABSTRACT

A method and system for remote control of self-propelled vehicles includes a leader vehicle and at least one follower vehicle located behind the leader vehicle. The leader vehicle traverses a waypoint, determines a first set of GPS coordinates corresponding to the waypoint, and transmits the first set of GPS coordinates to the follower vehicle. The follower vehicle determines a second set of GPS coordinates corresponding to its own position and compares the first set of GPS coordinates to the second set of GPS coordinates. By controlling steering, drive and braking systems of the follower vehicle with a servo-actuator, the follower vehicle is guided toward the waypoint by minimizing the difference between the first and second sets of GPS coordinates. This process is repeated at a succession of waypoints such that the follower vehicle traverses the same course as the leader vehicle.

11 Claims, 11 Drawing Sheets

METHODS AND SYSTEMS FOR REMOTE CONTROL OF SELF-PROPELLED VEHICLES

BACKGROUND OF THE INVENTION

1. Field of the Invention

The present invention relates generally to remote control and navigation of vehicles, especially vehicles in a convoy.

2. Description of the Background Art

Convoys, such as re-supply convoys, generally require at least one driver per truck. The trucks generally follow a lead truck over a course. The driver of the lead truck determines the course, and the drivers of each succeeding truck follow behind the lead truck. Since only the lead truck is operating independently, putting a driver in each of the succeeding trucks is a waste of manpower.

Different strategies for guiding unmanned vehicles have been tried. One strategy is the electronic towbar. An electronic towbar is similar to the adaptive cruise control of automotive use, wherein a vehicle senses the vehicle in front of it and follows at a predetermined distance. The sensing may be via reflection of an RF signal. Over rough terrain, however, or during severe maneuvers or weather conditions, the following vehicles may lose track of the vehicle in front of them. Electronic tow bars are also difficult to use in sharp turns, wherein steering and braking are performed simultaneously. Furthermore, simple following of a leading vehicle fails to keep the trailing vehicle on the road, since navigation of the trailing vehicle directly toward the lead vehicle will result in corners being cut.

Another strategy used for guiding unmanned vehicles is to mark a course for the vehicles to detect and follow. The markers for such a course may be nails in the ground or a wire. This works well for a fixed course that will be repeatedly traversed by vehicles. It is not a solution, however for a variable course over an unknown piece of terrain.

U.S. Pat. No. 5,532,690 to Hertel, for example, the disclosure of which is incorporated by reference, describes monitoring and bounding the path of a ground vehicle using a global positioning signal (GPS). If the vehicle ventures outside its area of permitted operation, a kill switch is activated to disable the vehicle. Hertel, however, describes no means of guiding an unmanned vehicle.

U.S. Pat. Nos. 5,646,843, 5,646,845, and 5,838,562 to Gudat et al., the disclosures of which are incorporated by reference, describe vehicle navigation either along a stored path, autonomously between two preset points, or along a path transmitted from a central location, using GPS. Gudet, however, describes no vehicle driven over an arbitrary course that transmits waypoints to a follower vehicle, so the follower vehicle can follow the same course.

U.S. Pat. No. 5,711,3838 to Davies et al., the disclosure of which is incorporated by reference, describes a robotic golf cart. The golf cart follows navigation rules according to a stored map. Davis, however, does not describe transmitting waypoints from one golf cart to a following golf cart, so that the following golf cart tracks the same course.

U.S. Pat. No. 5,872,526 to Tognazzini, the disclosure of which is incorporated by reference, describes a GPS collision avoidance system in which a vehicle operator of one vehicle receives GPS data transmitted by other vehicles. The positions of the other vehicles are then displayed on a monitor. Tognazzini, however, does not describe transmitting waypoints from a leader vehicle to a following vehicle, so that the following vehicle tracks the same course.

U.S. Pat. No. 5,917,405 to Joao, the disclosure of which is incorporated by reference, describes a theft deterrent system for a vehicle. The vehicle's location may be determined from a control apparatus by GPS, and certain functions may be performed, such as disabling the ignition. Joao, however, does not describe guiding the vehicle to a waypoint broadcast by another vehicle.

U.S. Pat. No. 5,921,708 to Grundl et al., the disclosure of which is incorporated by reference, describes a pavement vehicle convoy in which a follower vehicle is remotely controlled by a leader vehicle. Grundl, however, does not describe guiding the follower vehicle to a waypoint broadcast by the leader vehicle.

U.S. Pat. No. 5,921,708 to Suman et al., the disclosure of which is incorporated by reference, describes a RF vehicle remote control that performs such functions as vehicle tracking via GPS and locking doors. Suman, however, does not describe guiding the vehicle to a waypoint broadcast by another vehicle.

There remains a need in the art, therefore, for a remote control vehicle navigation system that allows a leader vehicle to choose an arbitrary course and be followed along that course by follower vehicles.

SUMMARY OF THE INVENTION

The invention provides a system for the remote control of self-propelled vehicles in which a leader vehicle is selected from among a group of similarly equipped vehicles and driven along an arbitrary course by a human driver, taking a succession of GPS coordinate position fixes, or waypoints, along the way, and broadcasting the succession of way points to at least one unmanned follower vehicle from the other vehicles in the group.

The follower vehicle, which can take its own GPS coordinate position fixes, has a comparator for comparing the set of GPS coordinate fixes received from the leader vehicle with its own position, and uses servo-actuators to operate its steering, drive, and braking mechanisms to minimize the distance between its own GPS position and the position of each of the succession of waypoints in turn. The follower vehicle thus traverses the same course as the leader vehicle. All the vehicles in the group are equipped to fill either a leader role or a follower role. If the comparator, for example, is embodied in a computer, then the role of leader or follower can be assigned by programming some software.

An object sensor may be mounted on the follower vehicle to avoid collisions with the vehicle in front, or other objects, if, for example, the signal carrying the GPS coordinates transmitted from the lead vehicle is unavailable. The follower vehicle can also be made to re-transmit the set of GPS coordinates to further following vehicles, in the manner of a repeater.

The above and other features and advantages of the present invention will be further understood from the following description of the preferred embodiments thereof, taken in conjunction with the accompanying drawings.

DETAILED DESCRIPTION OF THE PREFERRED EMBODIMENTS

Figure 1:
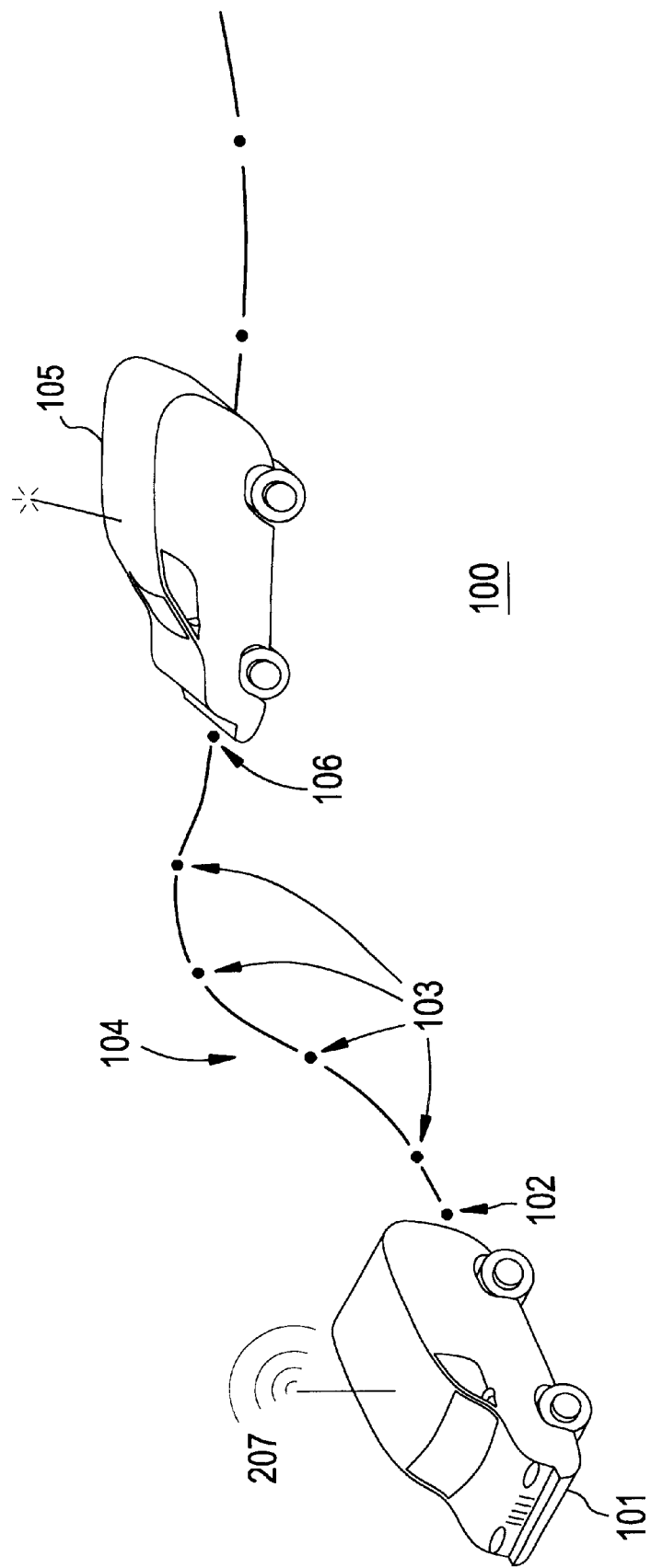
FIG. 1 is plan view of a system for the remote control of self-propelled vehicles according to a first embodiment of the invention.

In FIG. 1 is shown a system 100 for the remote control of self-propelled vehicles according to one embodiment of the invention. FIG. 1 shows a leader vehicle 101 traversing a waypoint 102 located at a set of GPS coordinates 103 as it follows a course 104. FIG. 1 also shows a follower vehicle 105 located at a second set of GPS coordinates 106.

Figure 2:
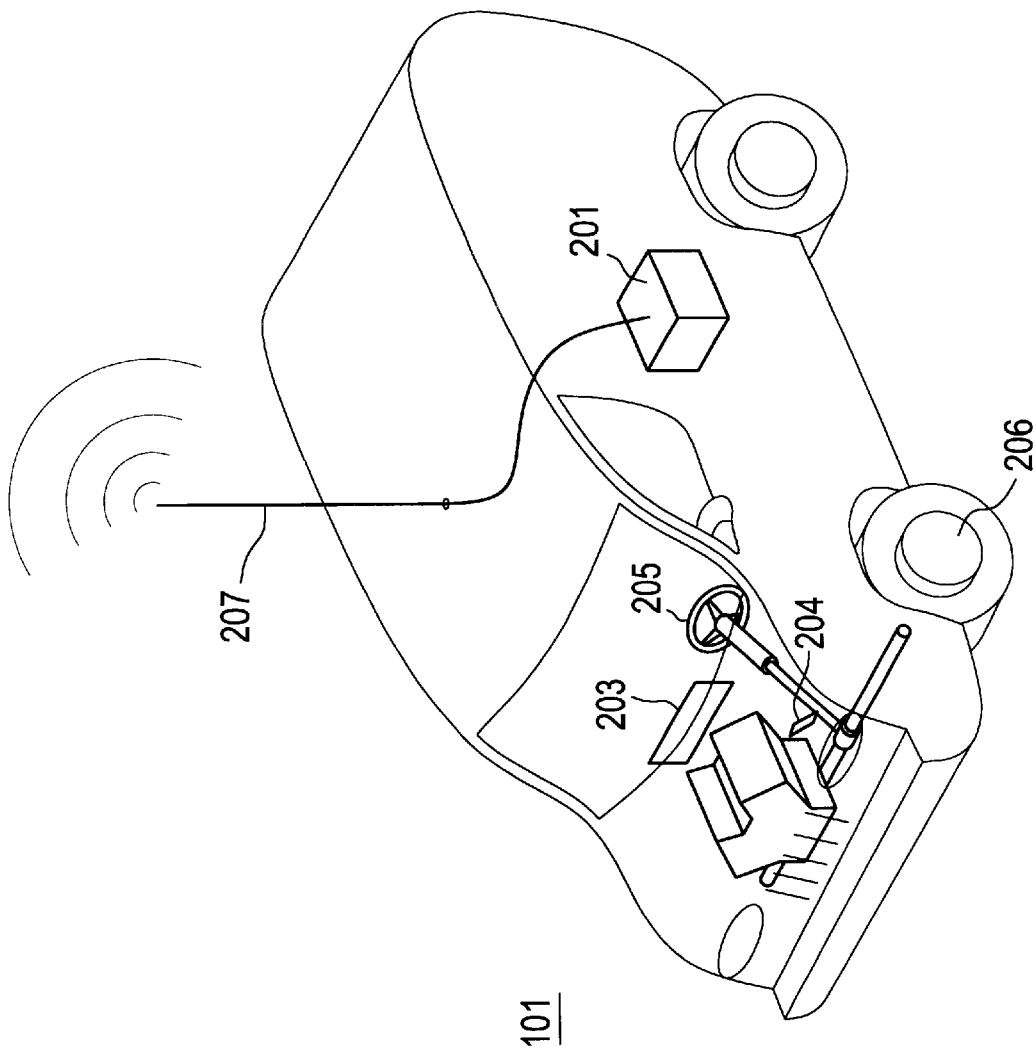
FIG. 2 is a plan view, partially cut-away, of a leader vehicle according to the embodiment of the invention shown in FIG. 1.
Figure 3:
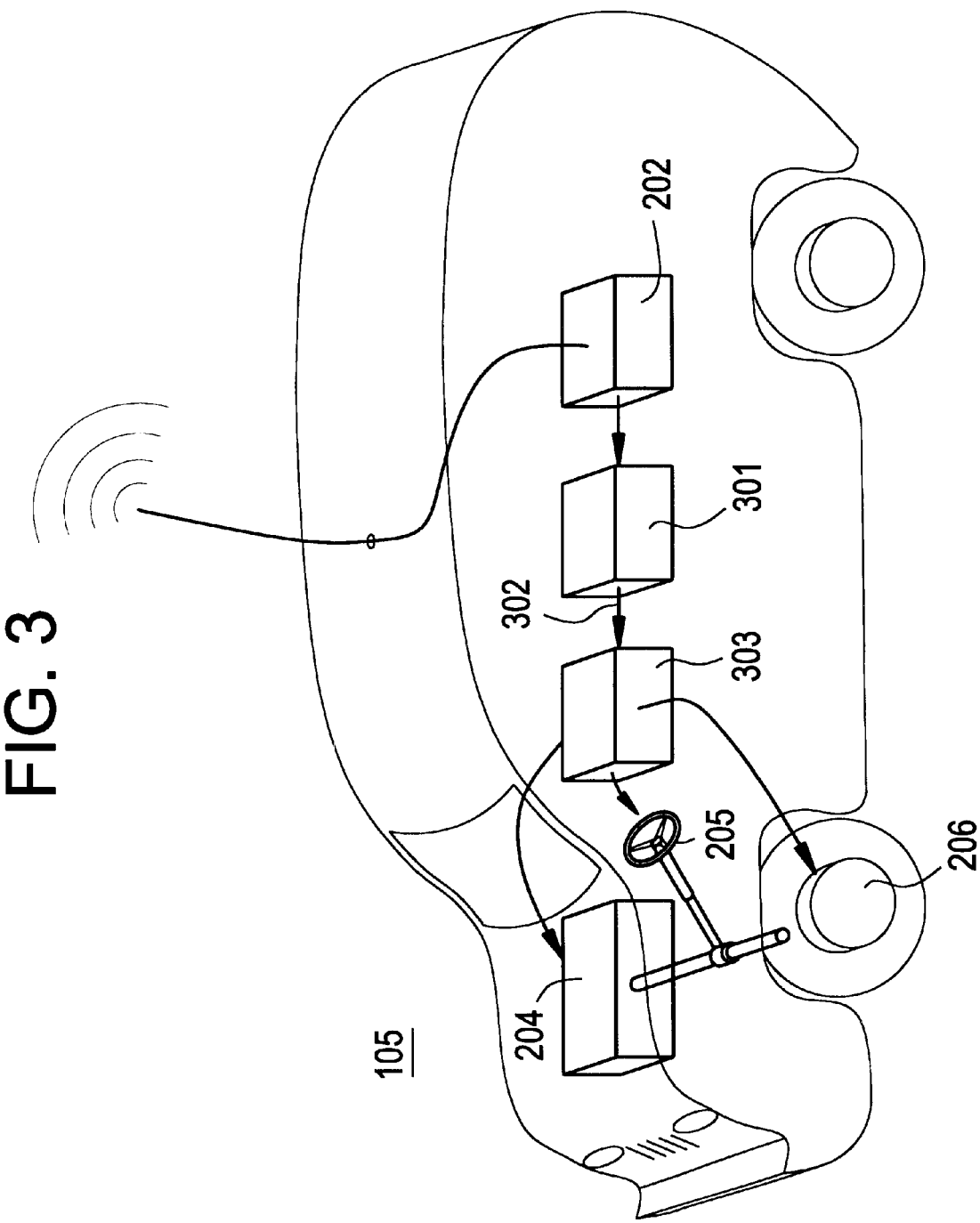
FIG. 3 is a plan view, partially cut-away, of a follower vehicle according to the embodiment of the invention shown in FIG. 1.

As shown in FIGS. 2 and 3, leader vehicle 101 has a transmitter 201 for transmitting via antenna 207 the first set of GPS coordinates 103 to a receiver 202 on follower vehicle 105. Leader vehicle 101 is equipped with manual controls 203 and propulsion 204, steering 205, and braking 206 mechanisms responsive to manual controls 203. A human driver (not shown) navigates leader vehicle 101 along course 104 by manipulating manual controls 203, as would be known to persons skilled in the art.

As shown in FIG. 3, follower vehicle 105 includes a comparator 301 for comparing the first set of GPS coordinates 103 to the second set of GPS coordinates 106, and outputting a difference 302. In a preferred embodiment, comparator 301 is a programmable computer. Difference 302 represents the distance and direction, i.e. the vector, of the location of waypoint 102 relative to follower vehicle 105. Follower vehicle 105 further includes a servo-actuator 303 responsive to the difference 302 generated by the comparator 301, and propulsion 204, steering 205, and braking 206 mechanisms responsive to servo-actuator 303. Servo-actuator 303 can be a plurality of servo-actuators assigned to the individual propulsion 204, steering 205, and braking 206 mechanisms, each individually responsive to comparator 301, as would be known to one of skill in the art. Servo-actuator 303 guides the follower vehicle 105 toward waypoint 102 by manipulating propulsion 204, steering 205, and braking 206 mechanisms to minimize the difference 302 between the first set of GPS coordinates 103 and the second set of GPS coordinates 106.

The GPS coordinate fixes may be provided to the follower vehicle 105 together with a time stamp. Follower vehicle 105 will then seek to minimize the difference 302 between its present position and the earliest received GPS fix that has not been processed. The-difference 302 may also include a time difference so that the follower vehicle 105 can determine how far ahead the leader vehicle 101 is in distance.

Figure 4:
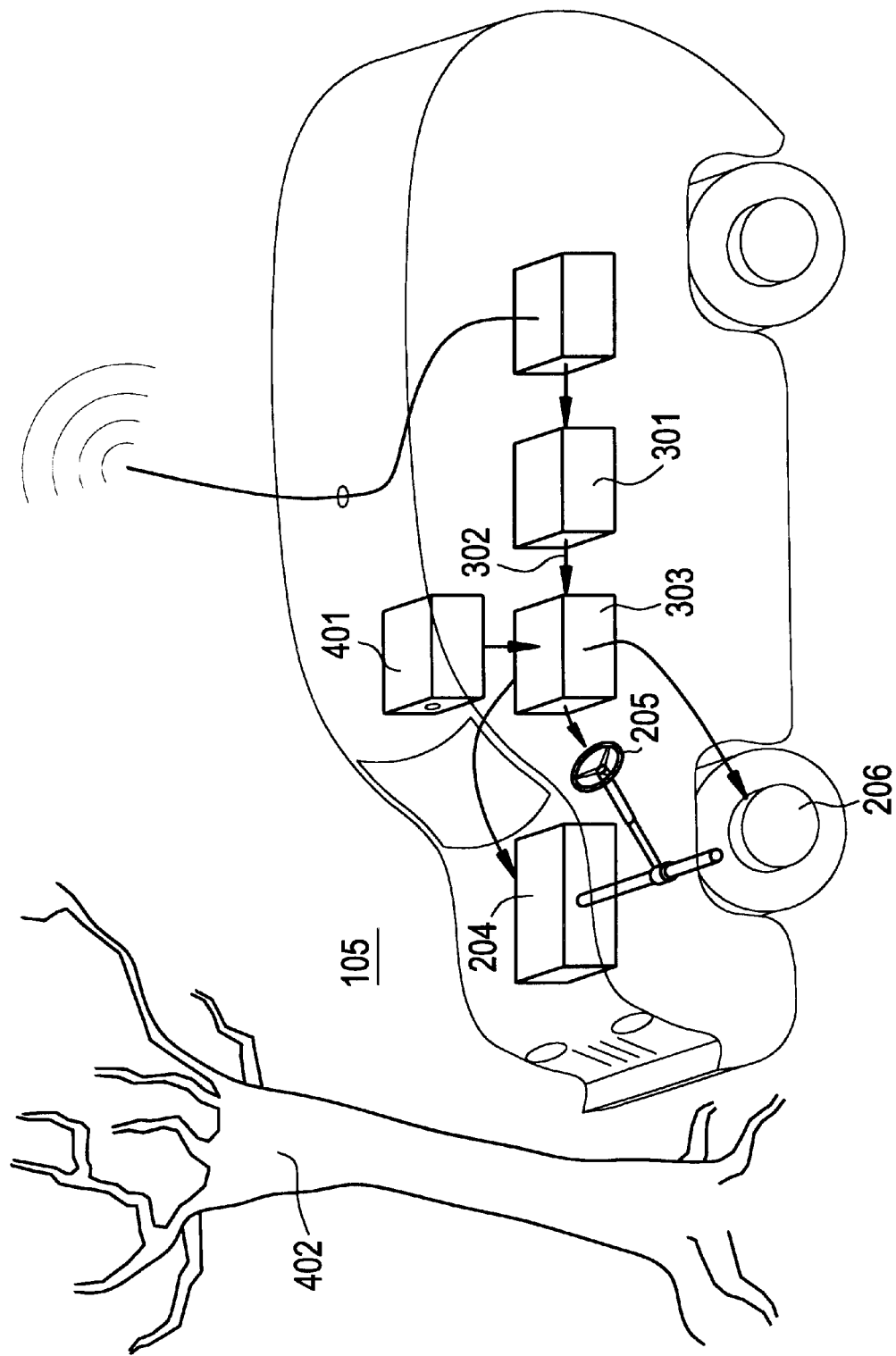
FIG. 4 is a plan view, partially cut-away, of another embodiment of the follower vehicle according to the embodiment of the inventions shown FIG. 1.

As shown in FIG. 4, follower vehicle 105 may also include an object sensor 401 for sensing the presence of objects 402, such as trees, buildings, or other vehicles, in the direction of travel of follower vehicle 105. In a preferred embodiment, object sensor 401 outputs a signal 403 to servo-actuator 303 so servo-actuator 303 can stop follower vehicle 105, or guide follower vehicle 105 around the object by manipulating propulsion 204, steering 205, and braking 206 mechanisms.

Figure 5:
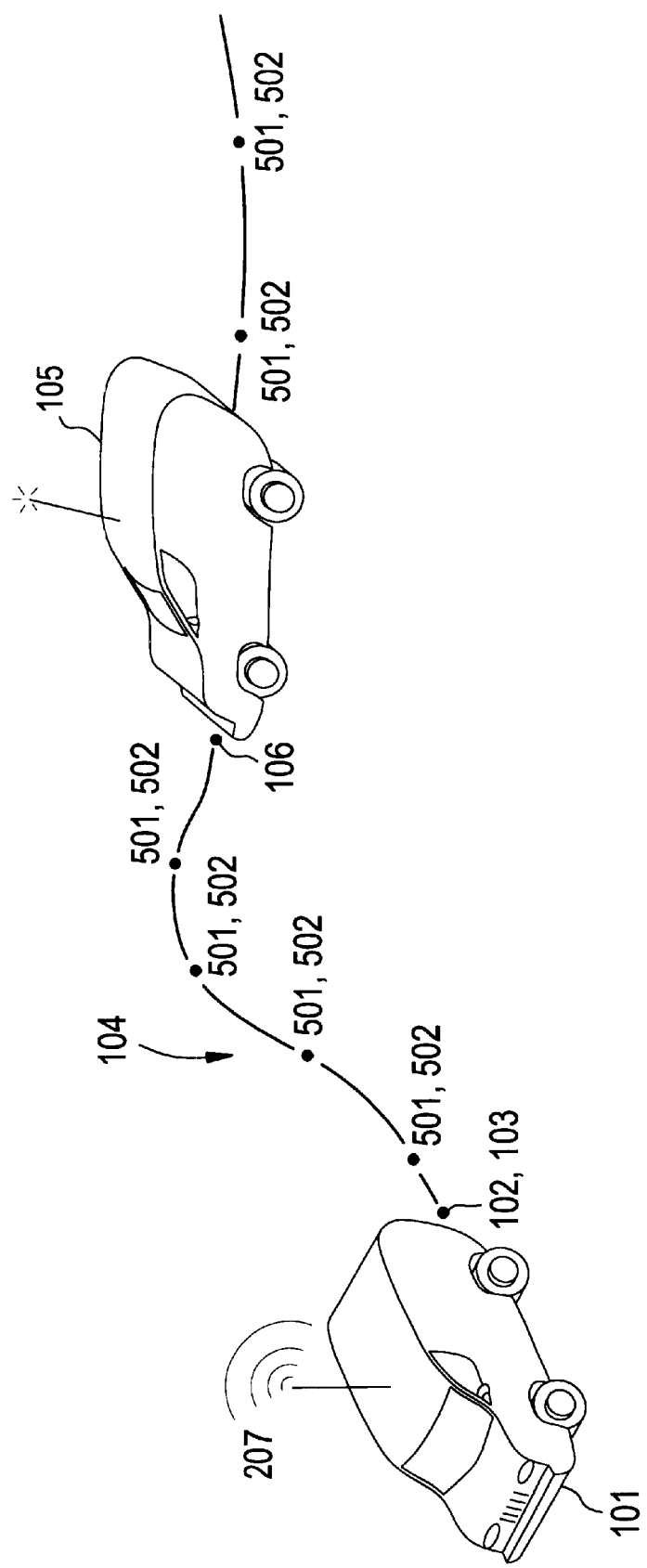
FIG. 5 is plan view of a system for the remote control of self-propelled vehicles according to a second embodiment of the invention.

In a preferred embodiment, shown in FIG. 5, waypoint 102 is one of a plurality of waypoints 501 along course 104 whose GPS coordinates 502 are transmitted at appropriate intervals as leader vehicle 101 traverses them. Since leader vehicle 101 is essentially transmitting the GPS coordinates of its own location at various intervals, the intervals can be chosen based on any convenient increment such as periods of time or distances traveled.

The leader vehicle 101 can also periodically check the GPS coordinates of its approximate location and only transmit the coordinates if they change by a predetermined amount relative to a previous reading. This would, be appropriate if, for example, bandwidth were at a premium, radio silence were being observed, or the vehicle odometer were unreliable, such as if leader vehicle 101 were traversing slippery terrain. The intervals between which the GPS coordinates 502 are transmitted may also vary depending on course 104. If, for example, course 104 is relatively straight and level, a few waypoints 501 could describe it. If, on the other hand, course 104 is steep or tortuous, the waypoints 501 may have to be spaced more closely together to define course 104.

Figure 6:
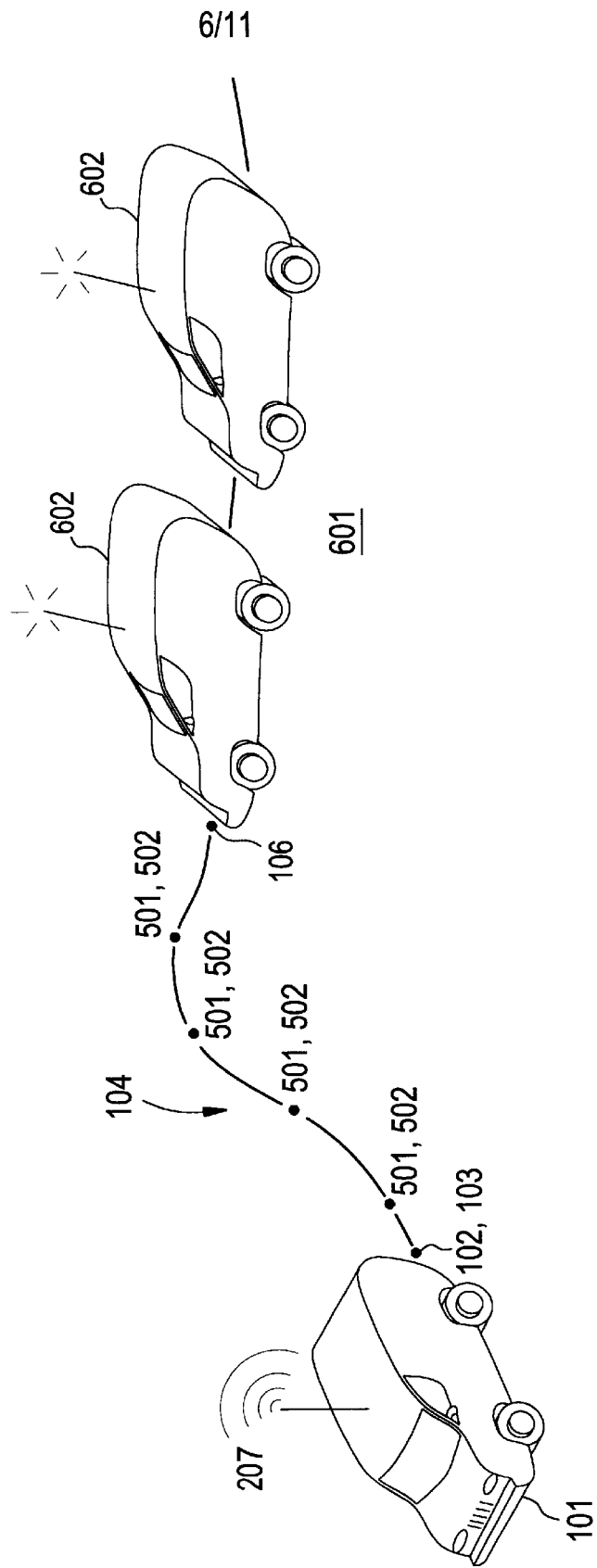
FIG. 6 is plan view of a system for the remote control of self-propelled vehicles according to a third embodiment of the invention.

In a preferred embodiment, shown in FIG. 6, leader vehicle 101 and follower vehicle 105 are two vehicles in a plurality of vehicles 602 comprising a convoy 601. Each of the plurality of vehicles 602 are similarly equipped with a transmitter 201, receiver 202, manual controls 203, propulsion 204, steering 205, and braking 206 mechanisms, antenna 207, comparator 301, and servo-actuator 303. Any of the plurality of vehicles 602 can be assigned to be leader vehicle 101, and the rest assigned to be follower vehicles, by programming comparator 301. Comparator 301 may be programmed, for example, to transmit waypoints 501, receive waypoints 501, activate servo-actuator 303 to guide the vehicle in response to difference 302 generated by the comparator 301, or defer to manual controls 203, depending on whether the vehicle has been assigned a leader or a follower role.

Figure 7:
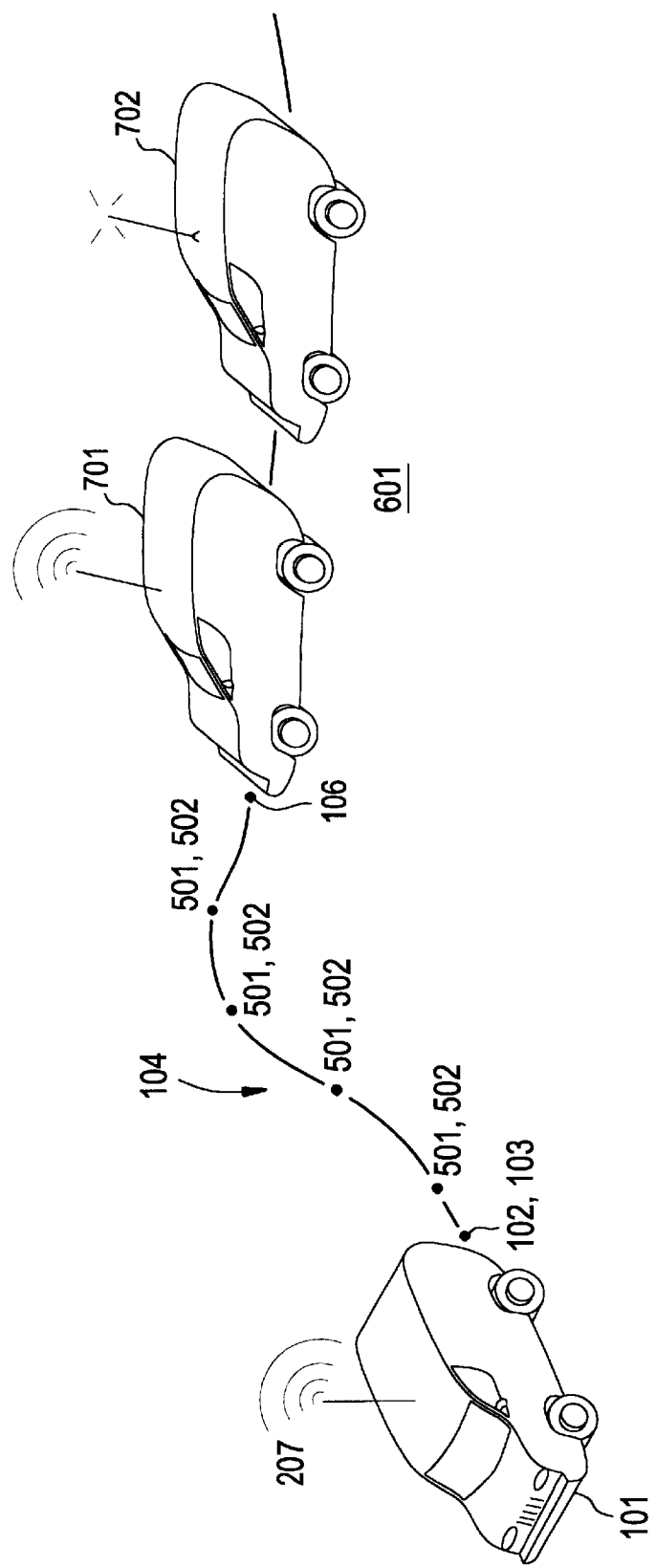
FIG. 7 is plan view of a system for the remote control of self-propelled vehicles according to a fourth embodiment of the invention.

In an alternate embodiment, shown in FIG. 7, one follower vehicle 701 re-transmits the GPS coordinates received from leader vehicle 101 in the manner of a repeater. This will allow others follower vehicles 702, which may be out of range or otherwise unable to receive the GPS coordinates transmitted by leader vehicle 101, to follow course 104 as well.

Figure 8:
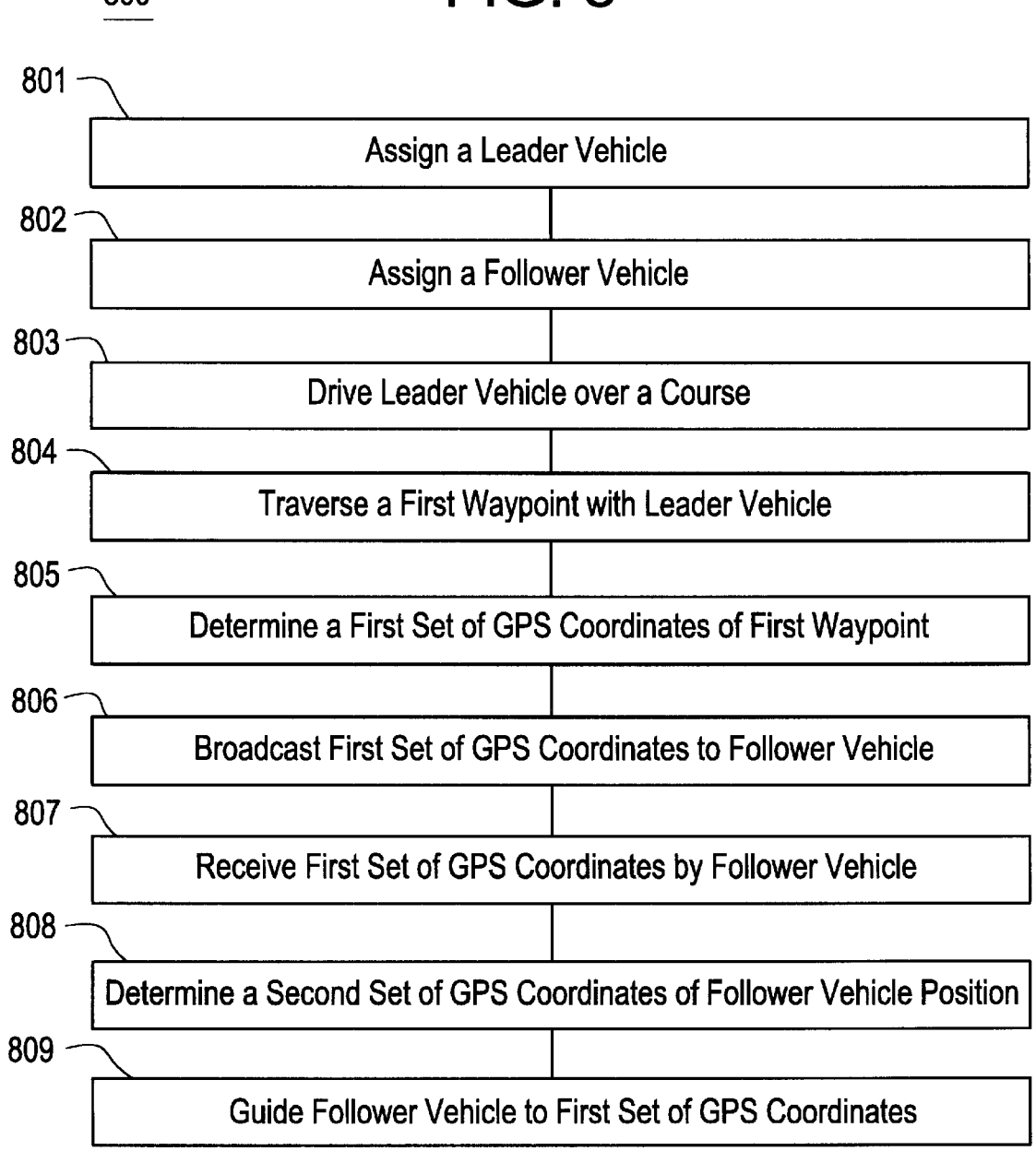
FIG. 8 is flow chart of a method for the remote control of self-propelled vehicles according to one embodiment of the invention.

In FIG. 8 is shown a flowchart of a method 800 for remotely controlling a plurality of self-propelled vehicles according to another embodiment of the invention. The process of ordering the vehicles is presented in a tabular format in the interest of compact, concise presentation. The tabular format in which the ordering process is described is a shorthand representation of an ordering process that will be familiar to, for example, mathematicians and software engineers. However, whether or not one practicing the method uses such a tabular format, or even consciously assigns any index, counter, delimiter, or place holder to the various elements of the method described in the accompanying figures, is not critical to the practice of the method.

In step 801 one of a plurality of vehicles is assigned to be a leader vehicle. In step 802 at least one of the plurality of vehicles that is not the leader vehicle is assigned to be a follower vehicle. In step 803 the leader vehicle is driven over a course. In step 804 the leader vehicle substantially traverses a first waypoint. In step 805 a first set of GPS coordinates are determined for the first waypoint. In step 806 the first set of GPS coordinates are broadcast to the follower vehicle. In step 807 the follower vehicle receives the first set of GPS coordinates. In step 808 the follower vehicle determines a second set of GPS coordinates, coincident with the current position of the follower vehicle. In step 809 the follower vehicle is guided from the second set of GPS coordinates to the first set of GPS coordinates.

Figure 9:
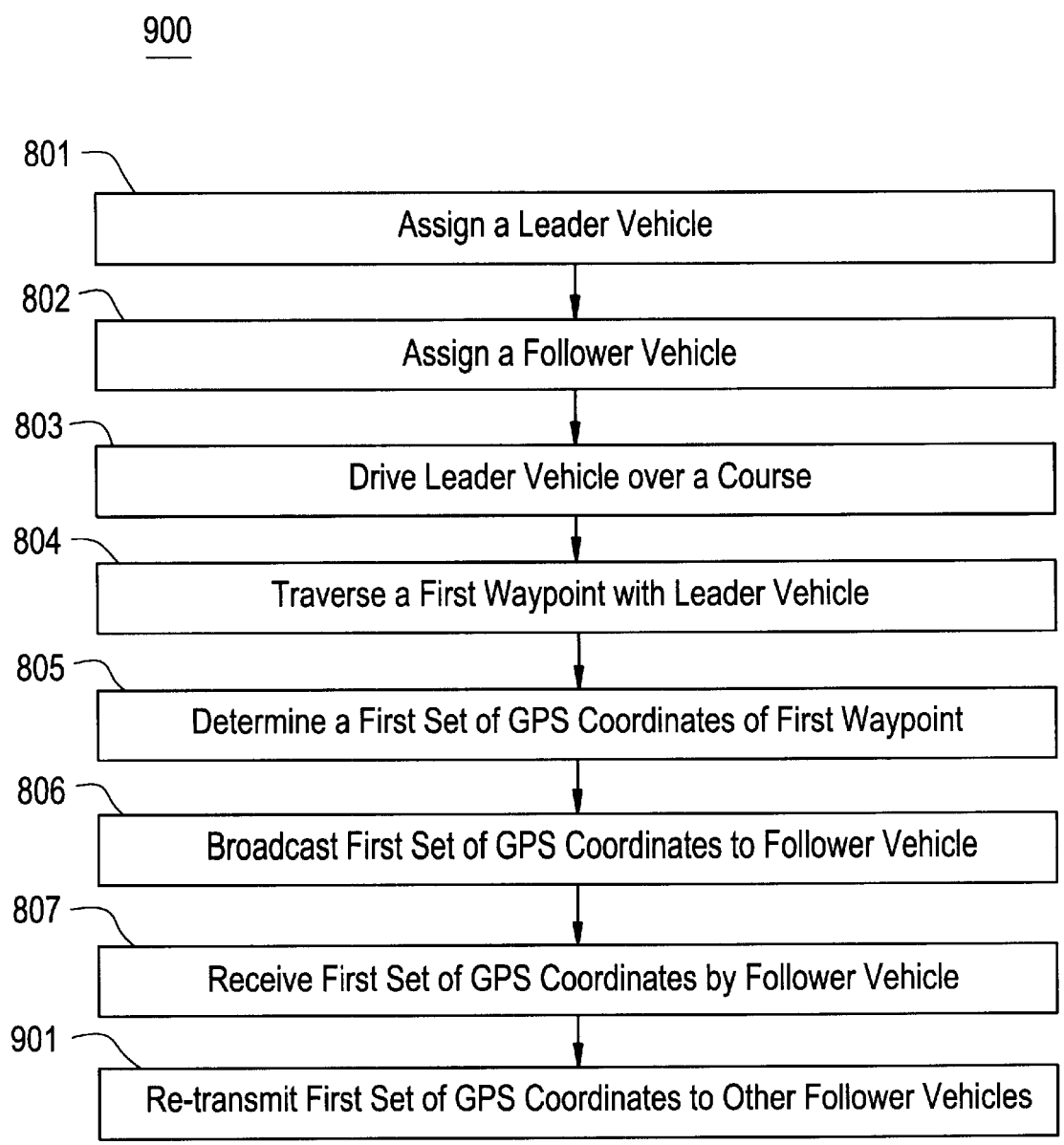
FIG. 9 is flow chart of a method for the remote control of self-propelled vehicles according to a second embodiment of the invention.

In FIG. 9 is shown a further embodiment 900. In step 901, following step 807, the first set of GPS coordinates is re-transmitted by the follower vehicle to other follower vehicles.

Figure 10:
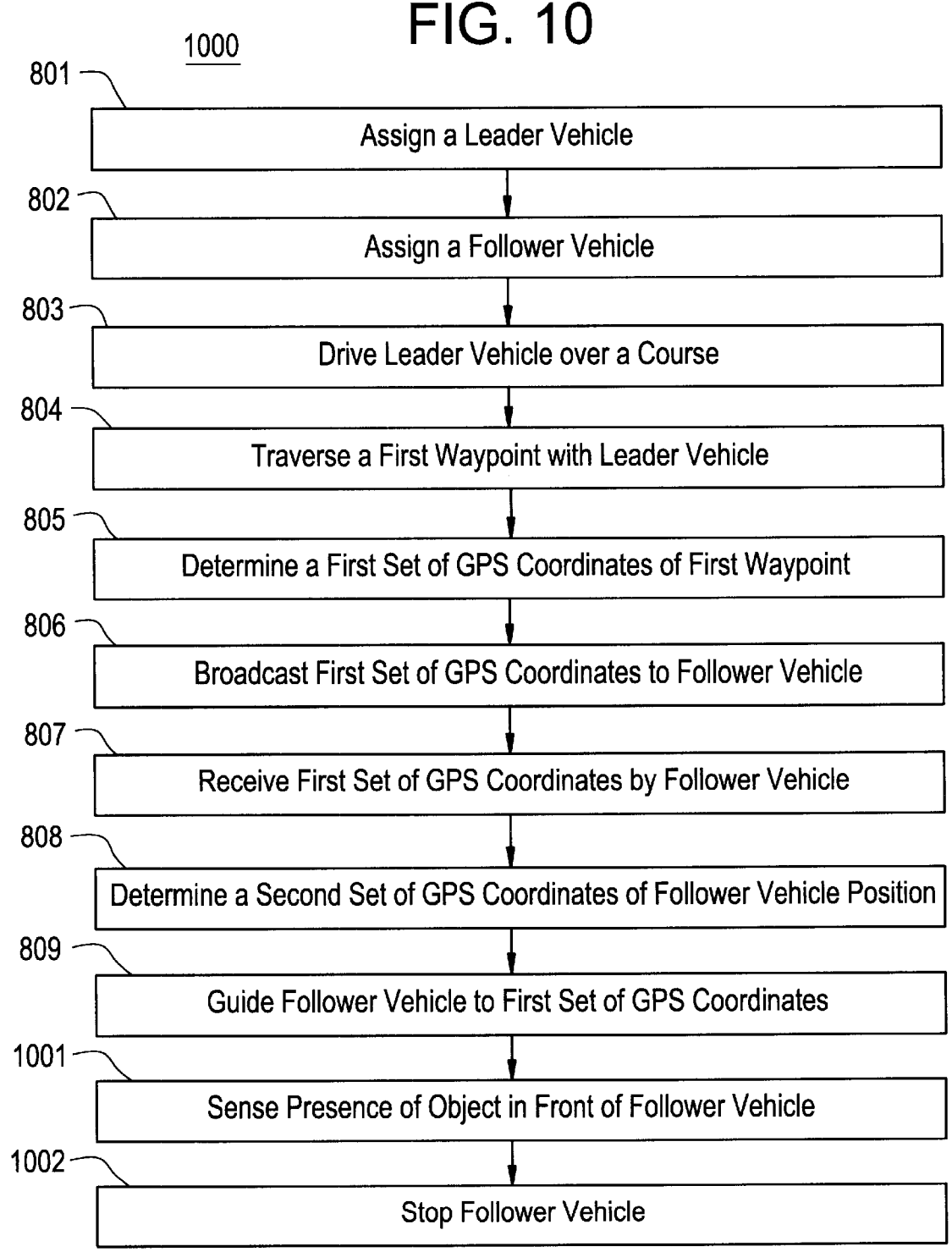
FIG. 10 is flow chart of a method for the remote control of self-propelled vehicles-according to a third embodiment of the invention.

In FIG. 10 is shown a further embodiment 1000. In step 1001, following step 809, the presence of an object is sensed in front of the follower vehicles. In step 1002 the follower vehicle stops before hitting the object. In a preferred embodiment, the follower vehicle avoids the object.

Figure 11:
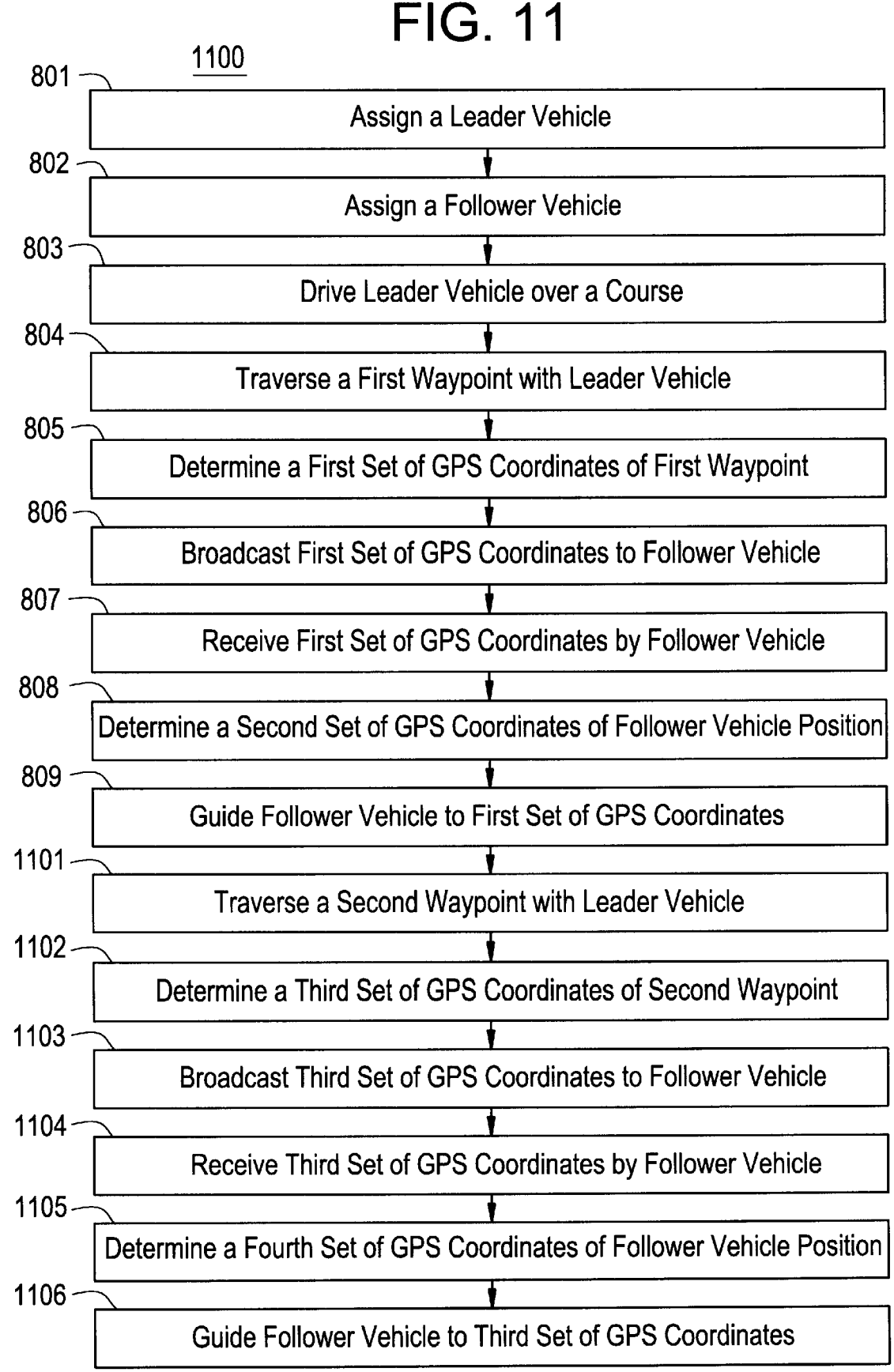
FIG. 11 is flow chart of a method for the remote control of self-propelled vehicles according to a fourth embodiment of the invention.

In FIG. 11 is shown a further embodiment 1100. In step 1101, following step 809, the leader vehicle is driven substantially over a second waypoint at a predetermined distance from the first waypoint. In step 1102, a third set of GPS coordinates, of said second waypoint, is determined by the leader vehicle. In step 1103 the third set of GPS coordinates is broadcast to the follower vehicle. In step 1104 the third set of GPS coordinates is received by the follower vehicle. In step 1105 a fourth set of GPS coordinates, coincident with a position of the follower vehicle, is determined by the follower vehicle. In step 1106 the follower vehicle is guided from the fourth set of GPS coordinates to the third set of GPS coordinates.

In addition to following the trail (i.e., set of waypoints) broadcast by the leading vehicle, each following vehicle receives time-stamp data from the immediately preceding vehicle. The time-stamp data is used by the vehicle to control its propulsion and braking systems to maintain a predetermined distance behind the immediately leading vehicle. The predetermined distance may vary as a function of vehicle speed.

During initial convoy configuration, each vehicle receives information identifying the lead (i.e., manually driven) vehicle, and uses the received waypoints from the lead vehicle for path navigation. Each vehicle also receives information identifying the immediately leading and immediately following vehicles. The immediately leading vehicle's time-stamp waypoints are used to maintain the predetermined distance, and the vehicle sends its own time-stamped waypoints to the immediately following vehicle for that vehicle to use in maintaining the predetermined distance from its immediate leader.

The initial configuration procedure can be implemented simply according to the order of the vehicles' initial positions as parked on a road. Vehicles may be dropped off or added to the convoy along the route and the configuration updated simply by making the omitted vehicle's immediate leader the new immediate leader of the omitted vehicle's immediate follower. Further, the above could be implemented with each vehicle knowing only its immediate follower and being required to transmit the overall leader's waypoints as well as its own time-stamp waypoints to its immediate follower.

While the invention has been described in detail above, the invention is not intended to be limited to the specific embodiments as described. It is evident that those skilled in the art may now make numerous uses and modifications of and departures from the specific embodiments described herein without departing from the inventive concepts.

What is claimed is:

1. A system for remote control of self-propelled vehicles, the system comprising:

a leader vehicle, said leader vehicle substantially traversing a waypoint, said waypoint located at a first set of GPS coordinates;

said leader vehicle determining said first set of GPS coordinates and transmitting said first set of GPS coordinates to at least one follower vehicle;

said follower vehicle located at a position behind said leader vehicle, said position being defined by a second set of GPS coordinates as determined by said follower vehicle;

said follower vehicle further comprising:

a receiver for receiving said first set of GPS coordinates from said leader vehicle;

a comparator for comparing said first set of GPS coordinates to said second set of GPS coordinates and outputting a difference therebetween;

a servo-actuator responsive to said difference output of said comparator for controlling steering, drive, and braking systems of said follower vehicle;

wherein said servo-actuator guides said follower vehicle toward said waypoint by minimizing the difference between said first set of GPS coordinates and said second set of GPS coordinates, and wherein:

said leader vehicle substantially traverses a second waypoint located a predetermined distance from said waypoint, said leader vehicle determining a third set of GPS coordinates of said second waypoint and transmitting said third set of GPS coordinates to said follower vehicle, said follower vehicle receives said third set of GPS coordinates and determines a fourth set of GPS coordinates coincident with a position of said follower vehicle; and said servo-actuator guides said follower vehicle from said fourth set of GPS coordinates to said third set of GPS coordinates.

2. The system for the remote control of self-propelled vehicles of claim 1, further comprising:

an object sensor mounted on said follower vehicle; and wherein said servo-actuator is responsive to said object sensor.

3. The system for the remote control of self-propelled vehicles of claim 1, wherein:

said waypoint is one of a plurality of waypoints.

4. The system for the remote control of self-propelled vehicles of claim 1, wherein:

said follower vehicle re-transmits said first set of GPS coordinates.

5. The system for the remote control of self-propelled vehicles of claim 1, wherein:

said comparator is a computer.

6. The system for the remote control of self-propelled vehicles of claim 1, further comprising:

a steering mechanism responsive to said servo-actuator.

7. The system for the remote control of self-propelled vehicles of claim 1, further comprising:

a propulsion mechanism responsive to said servo-actuator.

8. The system for the remote control of self-propelled vehicles of claim 1, further comprising:

a braking mechanism responsive to said servo-actuator.

9. A method of remotely controlling a plurality of self-propelled vehicles comprising:

a) assigning one of said plurality of vehicles to be a manned leader vehicle;

b) assigning at least one vehicle of said plurality of vehicles that is not the leader vehicle to be an unmanned follower vehicle;

c) driving said leader vehicle over a course;

d) determining a first set of GPS coordinates, by said leader vehicle, of at least a first waypoint substantially traversed by said leader vehicle;

e) broadcasting said first set of GPS coordinates to said follower vehicle;

f) receiving said first set of GPS coordinates by said follower vehicle;

g) determining a second set of GPS coordinates, by said follower vehicle, coincident with a position of said follower vehicle; and h) guiding said follower vehicle toward said first waypoint by minimizing the difference between said first set of GPS coordinates and said second set of GPS coordinates by automatic control of servo-actuated vehicle propulsion and guidance systems;

i) driving said leader vehicle substantially over a second waypoint at a predetermined distance from said first waypoint;

j) determining a third set of GPS coordinates, by said leader vehicle, of said second waypoint:

k) broadcasting said third set of GPS coordinates to said follower vehicle;

l) receiving said third set of GPS coordinates by said follower vehicle;

m) determining a fourth set of GPS coordinates, by said follower vehicle, coincident with a position of said follower vehicle; and n) guiding said follower vehicle from said fourth set of GPS coordinates to said third set of GPS coordinates.

10. The method of remotely controlling a plurality of self-propelled vehicles of claim 9, further comprising the steps of:

o) re-transmitting said first set of GPS coordinates by said follower vehicle.

11. The method of remotely controlling a plurality of self-propelled vehicles of claim 9, further comprising the steps of:

o) sensing an object in front of one of the vehicles;

p) avoiding the object.

* * * * *